US008781416B1

(12) United States Patent
Clark et al.

(10) Patent No.: US 8,781,416 B1
(45) Date of Patent: Jul. 15, 2014

(54) ADAPTING TRANSMIT PARAMETERS IN HIGHLY DYNAMIC CHANNEL

(75) Inventors: Stephen M. Clark, Evansdale, IA (US); Ray L. Cross, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 244 days.

(21) Appl. No.: 13/228,993

(22) Filed: Sep. 9, 2011

(51) Int. Cl.
*H03C 1/62* (2006.01)

(52) U.S. Cl.
USPC .................. 455/115.3; 455/115.1; 455/115.2; 455/114.2; 455/126; 455/127.2

(58) Field of Classification Search
USPC .......... 455/91, 108, 114.2, 115.1, 115.3, 126, 455/127.1, 127.2
See application file for complete search history.

(56) References Cited

U.S. PATENT DOCUMENTS

| | | | | |
|---|---|---|---|---|
| 5,982,766 | A * | 11/1999 | Nystrom et al. | 370/347 |
| 6,493,331 | B1 * | 12/2002 | Walton et al. | 370/341 |
| 6,744,743 | B2 * | 6/2004 | Walton et al. | 370/318 |
| 7,050,419 | B2 * | 5/2006 | Azenkot et al. | 370/347 |
| 7,295,549 | B2 * | 11/2007 | Pepin et al. | 370/352 |
| 7,315,967 | B2 * | 1/2008 | Azenko et al. | 714/704 |
| 7,403,780 | B2 | 7/2008 | VanLaningham | |
| 2002/0154620 | A1 * | 10/2002 | Azenkot et al. | 370/347 |
| 2002/0183054 | A1 * | 12/2002 | Rimoni et al. | 455/423 |
| 2003/0123425 | A1 * | 7/2003 | Walton et al. | 370/341 |
| 2004/0160979 | A1 * | 8/2004 | Pepin et al. | 370/462 |
| 2005/0039103 | A1 * | 2/2005 | Azenko et al. | 714/776 |
| 2007/0040704 | A1 * | 2/2007 | Smee et al. | 340/981 |
| 2008/0091976 | A1 * | 4/2008 | Avadhanam | 714/37 |
| 2009/0290555 | A1 * | 11/2009 | Alpert et al. | 370/331 |

OTHER PUBLICATIONS

Kawadia, V.; Kumar, P.R.; "Principles and Protocols for Power Control in Wireless AD Hoc Networks," IEEE Journal on Seleced Areas in Communications; pp. 76-88 vol. 23, No. 1, Jan. 2005, DOI: 10.1109/JSAC.2004.837354(410) 23.

Pursley, M.B.; Wilkins, C.S.; , "Adaptation of the Code Rate and Transmitter Power in Frequency-Hop Communications," *Wireless Communications, IEEE Transactions On*, vol. 3, No. 1, pp. 107-116, Jan. 2004, DOI: 10.1109/TWC.2003.821143.

(Continued)

*Primary Examiner* — Temesgh Ghebretinsae
*Assistant Examiner* — Richard Chan
(74) *Attorney, Agent, or Firm* — Donna P. Suchy; Daniel M. Barbieri

(57) ABSTRACT

A processor determines, from signals received from other communication devices, one selected transmission mode for the communication channel conditions. The processor projects multiple channel characterization parameters in a mathematical model to each of the candidate transmission modes using a model of nominal communication channel conditions to predict whether each of the candidate transmission modes will achieve the desired communication under the nominal communication channel conditions. This results in the generation of a first subset of transmission modes. The processor also projects the multiple channel characterization parameters to each of the candidate transmission modes using a model of degraded communication channel conditions to predict whether each of the candidate transmission modes will achieve the desired communication under the degraded communication channel conditions. Such a determination results in generating a second subset of transmission modes that would successfully achieve communication. One selected transmission mode that maximizes communication objectives is selected.

18 Claims, 1 Drawing Sheet

(56) References Cited

OTHER PUBLICATIONS

Pursley, M.B.; Wilkins, C.S.; , "Adaptive Transmission for Frequency-Hop Communications With Reed-Solomon Coding," Communications, Computers and Signal Processing, 1997. '10 Years PACRIM 1987-1997—Networking the Pacific RIM'. 1997 IEEE Pacific RIM Conference on , vol. 2, No. pp. 866-869 vol. 2, Aug. 20-22, 1997, DOI:10.1109/PACRIM.1997.620397.

Laster, J.: Reed, J. Tranter, W.; "Bit Error Rate Estimation Using Probability Density Function Estimators," IEEE Transactions on Vehicular Technology, vol. 51, No. 1, pp. 260-267, Jan. 2003, DOI; 10.1109/TVT.2002,807229 (Note—Pub is Incorrect and Should be Cited as vol, 52).

Rintamaki, M.; "Adaptive Power Control in CDMA Cellular Communication Systems," Helsinki University of Technology, Signal Processing Laboratory; Report 53, pp. i-xx and 1-169, 2005.

* cited by examiner

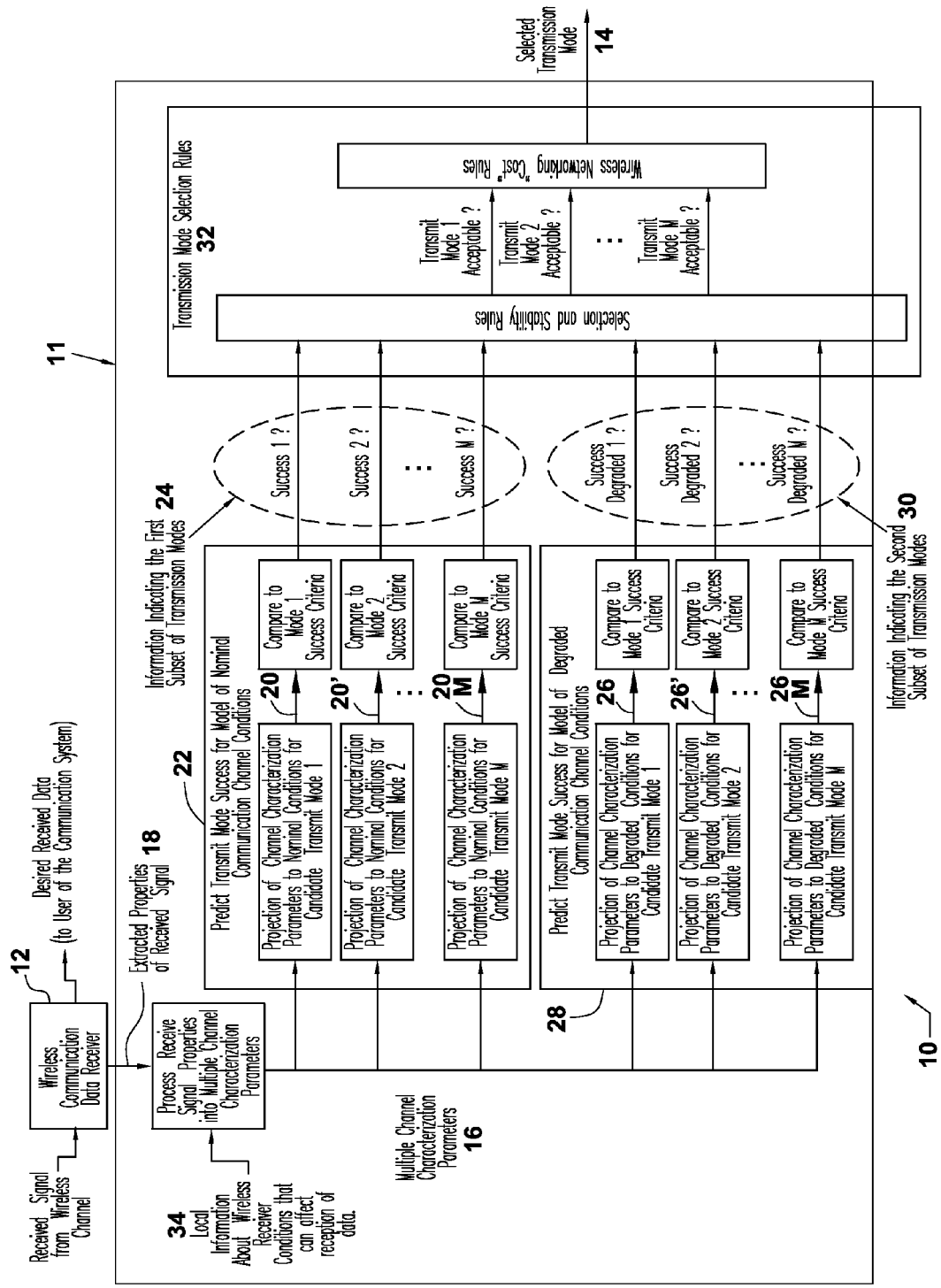

ADAPTING TRANSMIT PARAMETERS IN HIGHLY DYNAMIC CHANNEL

GOVERNMENT LICENSE RIGHTS

The U.S. Government has a paid-up license in this invention and the right in limited circumstances to require the patent owner to license others on reasonable terms as provided for by the terms of Government Contract No. FA8650-06-D-7636/0014 awarded by the Air Force Research Laboratory.

BACKGROUND OF THE INVENTION

1. Field of the Invention

The present invention relates generally to communication devices, and more particularly to wireless communication devices that network their communications and must share the same limited communication resources (such as radio frequency spectrum). This sharing of resources leads to possible interference between communicating devices. The present invention provides for the individual wireless communication devices using the available communication resources in a manner that permits a mutual sharing of the resources by all of the wireless communication devices. This sharing of the communication resources is done in a way that tends to maximize the communication capabilities of the individual wireless communication devices under the constraint of not excessively reducing the communication capabilities of the other wireless communication devices sharing the same resources.

2. Description of the Related Art

Many wireless data link systems today have the ability to transmit at multiple power levels, at different data-rates, while choosing modulations using differing amounts of spectrum usage (i.e. bandwidth). The change in data-rate and bandwidth is typically accomplished by using variable amounts of Forward Error Correction (FEC) and/or changing the modulation-type. Since the wireless communication system will generally not be operating in isolation but typically operates in an environment of many other similar communicating wireless devices, it is desirable that the selection of the combination of transmit-power level, data-rate, and modulation-type, either achieve or approximate some optimum for the whole collection of communicating devices. A combination of transmit-power level, data-rate, and modulation-type will also be referred to hereafter as a "transmit mode" or simply as a "mode".

Thus, a problem of choosing a true global optimum, i.e. the correct transmit mode for every wireless device, for an arbitrary collection of wireless devices would require extensive knowledge of all the states of the communication devices and the communication channel conditions between all communicating devices. This part of the problem itself would require a considerable data flow. If this data flow were to be carried across the same communication channels as provided by the wireless devices under discussion, these data flows could have severe adverse impact on the overall wireless communication network for its main desired purpose of passing data for users of the system; data passed through the system related to maintaining the communication network itself detracts from the network's main purpose. There is also the problem of computing the correct global optimum for the whole network and how this solution will be distributed. These considerations result in a nearly intractable problem for many kinds of wireless communication networks. Consequently, many wireless networks, the present invention included, as will be disclosed below in detail, take as an approximate solution the adjustment of the transmit mode for the individual communication links between pairs of nodes. This adjustment strives to achieve an acceptable level of communication performance while treating all the other communication in the wireless network as though they were merely uncoordinated interference to the desired communication. Treating all of the other wireless communication as interference is in contrast to calculating a globally optimum (or approximately globally optimum) solution based on exact information about all other wireless communication device behavior. The approach of treating other legitimate users as interference to the desired communication achieves the additional benefit of the wireless communication network responding appropriately when real sources of interference appear in the network. Communication between a pair of wireless communication devices will be referred to as a "communication link" or simply as a "link". The approximate solution to resource sharing adjusts the transmit parameters for each link by "adapting" the parameters to achieve communication without excessive use of communication resources: hence the name "link adaptation". A naïve approach to link adaptation would be for each pair of wireless communication devices to maximize communication resource usage for all the available parameters of its particular link. However, this would be counter-productive for many communication configurations as the available communication resources would not be shared; the mutual interference could actually eliminate the possibility of reliable communication. Consequently, link adaption, must be done in a way that results in a mixture of maximizing some aspects while minimizing other aspects to achieve the balance between the needs of the individual communication links and the performance of the complete collection of wireless communication devices taken as a whole.

The present invention provides a method of achieving this balance while also achieving other desirable characteristics not present simultaneously in other prior inventions. Some prior inventions achieve link adaption by increasing or decreasing a particular communication parameter in steps approximating a real-time negative-feedback control loop. This method requires almost constant two-way communication between the communicated devices. Although the present invention also requires two-way communication between the wireless devices, the present invention does this in a way that enables ad-hoc communication channels or massively asymmetrical amounts of communication between the nodes; nearly continuous communication that simulates a negative-feedback control system is therefore not necessary.

Prior inventions typically achieve link adaptation based on evaluating the performance of the communication taking place for one particular transmission mode—this transmit mode is typically the one presently in use and is the only one in use for that particular link. The present invention in contrast makes use of information derived from all communications that can be received by the receiving communication device from all of the transmissions made by the transmitting communication devices regardless of which transmit mode is being used and regardless of whether the communication is specifically directed at the receiving communication device. This supports ad-hoc type transmissions; multiple transmit modes might be in use for different communication purposes. The ability to use the information derived from several different transmit modes reduces the need for transmissions made specifically to achieve link adaptation.

Most link adaptation systems today either represent or can be put into a form that gives the solution space as a set of 'states' corresponding to all of the transmission modes that are possible. These adaptive algorithms then use signal-to-noise ratio plus possibly symbol error rate and other parameters to determine when to change from the current state to another state. Prior inventions typically limit the change to only those states that are connected to the state previously in use where the connections between the states are typically limited to a simple ordered list based on how robust a particular state is expected to be. Typically a heuristic algorithm decides when to change state, either more robust, or less robust from the predetermined simple ordered list. This simple ordered-state based approach does not work well in complex channels, such as interference channels or multipath channels. This is because the optimal or approximately optimal connections between the states change in a very complex manner as a function of the changing channel conditions; in other words, the states cannot remain a single simple ordered list. Additionally, many prior inventions determine the correct state based on first changing state then measuring the response to the change; this is undesirable if the transmissions are sporadic and infrequent. In contrast, the present invention does not use a simple ordered list of states. In principle each of the transmit modes are candidates for the new link adaptation solution starting from any other transmit mode. Although, the present invention could be viewed conceptually as a set of states with every possible state connected to every possible state, the present invention's innovation may be seen as determining and then changing immediately to the correct transmit mode without having to pass through intermediate 'states'. This means there is no single intrinsic "robust" order to transmit modes since that order would depend on constantly changing communication channel conditions.

This lack of intrinsic ordering within the transmit modes is one of the strengths of the present invention allowing the link adaptation to be robust in adverse channel conditions. Even though the transmit modes don't have an intrinsic order, each of the parameters of power, data-rate, and modulation types that make up the transmit mode do have individual orders within the individual parameters. These internal orderings permit the present invention to infer many of the calculation results without explicit calculation of all possible transmit modes thereby resulting in a reduction in computational complexity.

SUMMARY OF THE INVENTION

In a broad aspect, the present invention is a wireless communication device for cooperatively exchanging information with a plurality of other communication devices. The device includes a processor configured to determine, from signals received from other communication devices, one selected transmission mode for the communication channel conditions. The determination is made through the following process:

The processor obtains multiple channel characterization parameters from signal quality parameters extracted from the available received signal properties that are being transmitted at any of the candidate transmission modes available to the transmitting wireless device. It further projects the multiple channel characterization parameters in a mathematical model to each of the candidate transmission modes using a model of nominal communication channel conditions to predict whether each of the candidate transmission modes will achieve the desired communication under the nominal communication channel conditions. This results in the generation of a first subset of transmission modes. The processor also projects the multiple channel characterization parameters in a mathematical model to each of the candidate transmission modes using a model of degraded communication channel conditions to predict whether each of the candidate transmission modes will achieve the desired communication under the degraded communication channel conditions. Such a determination results in generating a second subset of transmission modes that would successfully achieve communication. One selected transmission mode that maximizes communication objectives is selected from the first subset of transmission modes and the second subset of transmission modes. The selected transmission mode maximizes communication objectives while remaining stable based on the rules that embody the communication objectives. Particular communication objectives will depend upon the particular communication network but includes balancing the communication needs of individual wireless devices against the needs of the whole communication network by using link adaptation that will support ad-hoc communication and not just centralized or infrastructure dependent control networks.

The characterization of the communication channel does not depend on the actual transmission mode in use at the time of characterization.

The present invention determines the correct state from available received transmissions even if those transmissions were made using a different state from the final answer or the prior selected answer.

The adaptation technique described herein avoids this complex state transition type of approach of the prior art. All possible valid states are computed and an algorithmic method is used to resolve to one answer.

The present invention concerns wireless communication devices and how they can be made to effectively share communication resources. Wireless communication devices are broadly defined as being communication devices that do not use fixed communication paths such as wires to achieve the connection between the communication devices but rely instead on the free propagation of some form of energy. This energy is typically electromagnetic in nature and can include such examples as radio waves, infra-red radiation, visible-light, ultra-violet, x-ray, gamma-rays etc. However, the energy used to achieve the communication envisioned by this invention is not constrained to be electromagnetic in nature; the propagating energy could be acoustic in nature including infra-sonic, audible, and ultra-sonic etc. The communication could also be chemical in nature resulting in the distribution of chemical changes through direct or indirect interactions. Consequently, wires, in the context of this disclosure, are not limited to metallic conductors carrying electrical energy but can be considered any engineered or natural material or medium that is capable of conveying signals from one communication device to another without the energy or changes conveyed substantially adding to, mixing with, altering, or modifying the communication energy contained within other similar constructs that also carry communication energy. Therefore in this context a "wire" would, in addition to conventional metallic wires and cables, also include such constructs as fiber optic cables (and other light pipes), radio energy waveguides, acoustic waveguides, and delineated paths for chemical change propagation. Certain combinations of focusing mechanisms such as lenses or highly directive antenna systems can in principle also provide the isolation required to constitute a "wire" for this purpose. The essence then of the wireless communication device is that the communication energy is not substantially constrained or isolated to follow certain paths and therefore the communication energy or changes can affect multiple communication devices at the same time regardless of whether the communication was specifically intended for a particular device or not. Consequently, in such a "wireless" environment, there is of necessity a type of sharing of the medium of communication. In some cases isolation can still be achieved through other means such as frequency separation, coding etc. In many cases these other means of separation are either not available (such as regulatory constrains on the use of spectrum) or through a desire to achieve some other goal such as less complexity in the means of accessing the communication medium. Although the present invention relates generally to electronic communication devices, and more particularly to wireless communication devices using electromagnetic energy a person skilled in the relevant art could easily transfer the concepts specific to electromagnetic communications described herein to the equivalent acoustic or chemical energy concepts.

This invention has applicability in many wireless communication fields but is of particular advantage in undeveloped areas and for military purposes. There is a need in such cases for communication systems that do not have as much centralized command and control infrastructure and which can adapt to rapidly changing situations and failures of equipment.

BRIEF DESCRIPTION OF THE DRAWINGS

FIG. 1 is a schematic illustration of the wireless communication device of the present invention.

DETAILED DESCRIPTION OF THE INVENTION

Referring now to the drawings and the characters of reference marked thereon, FIG. 1 illustrates a wireless communication device for cooperatively exchanging information with a plurality of other communication devices, the wireless communication device being designated generally as 10. The other communication devices are typically also wireless devices. The device 10 includes a wireless communication data receiver 12 for receiving a signal from a wireless channel of another communication device. The wireless communication data receiver is that portion of the wireless communication device which interacts with the wireless signals extracting the data and parameters of the signals used to convey the data. The device 10 includes a digital processing element 11, that is configured to determine, from the signals received from other communication devices, one selected transmission mode 14 for the communication channel conditions. A transmission mode is defined as a particular combination of transmit power, data-rate, and modulation. Once a particular transmission mode has been selected as the solution to achieve the desired communication, it becomes the "selected transmission mode". The digital processing element used to compute the selected transmission mode may be a general purpose type processor such as described in RTCA DO-255, which is well known in the aviation industry, or a microprocessor such as a PowerPC microprocessor manufactured by International Business Machines Corporation, or a digital signal processor such as a Texas Instruments TMS320C6727, or a programmable logic device such as a field programmable gate array (FPGA). It may also comprise associated support circuitry, such as program memory, working memory, and digital input/output interfaces, as is known in the art. The digital processing element is configured to make this determination by the following process:

Multiple channel characterization parameters 16 are obtained from signal quality parameters extracted from the available received signal properties 18.

The received signal properties 18 are extracted from the received signals originating in other wireless communication devices by the wireless communication data receiver. These received signal properties may include one or more of the following: the signal-to-noise ratio (SNR), signal strength, phase stability, frequency stability, message decoding success statistics, channel symbol quality statistics, and an indication of which actual transmission mode that was used to transmit the signal to the wireless communication device. The other wireless communication devices, acting as transmitting wireless devices, are sending information that can be transmitted at any of the candidate transmission modes available to the transmitting wireless device. Candidate transmission modes are any transmit modes available to a wireless communication device when it becomes a transmitting wireless device. The actual transmission mode refers to the transmission mode that was actually in use by the transmitting wireless device at the time the wireless communication data receiver 12 extracts the received signal properties.

As noted above, a mode or transmission mode or a transmit mode is a combination of transmit-power, modulation-type, and data-rate, that could be used at the transmitter. A "mode" combines the three elements that correspond to the elements of a simple form of the Shannon-Hartley capacity theorem. That theorem relates the achievable communication capacity of a communication channel (in terms of information bits per second) to the available bandwidth and signal-to-noise ratio (SNR). The achievable communication capacity (in bits per second) is related to the ability of a wireless communication device to communicate at a particular data-rate. The bandwidth is related to the modulation-type used. Finally the signal-to-noise ratio is related to the channel conditions, the noise, the interference, and the transmit-power. The wireless communication device can only directly control the signal-to-noise ratio via changes to the transmit-power.

Transmit power is defined as the power (the rate of energy usage) that a wireless communication device radiates or transmits as part of its goal of communicating with other wireless communication device that will receive the transmissions. In the case of a wireless communication device that might not use electromagnetic or acoustic means of communication (such as chemical means) the transmit-power would correspond to the rate at which the communication resources were expended.

Bandwidth is the amount of spectrum resources consumed by a particular modulation type. It is measured in Hertz. In more general communication cases, it might be generalized to include concepts of how much of the commonly assessed communication resource the given modulation consumes. For example, it could be generalized to be related to the amount of "code space" that a communication system uses for communication that shares the communication medium through spread-spectrum or other coding techniques of code-division-multiple-access (CDMA). It could also represent the number of time slots consumed in some abstracted multi-user version of time-division-multiple-access (TDMA).

As part of the processing to produce multiple channel characterization parameters 16, any of the received signal properties 18 can be affected by local conditions in addition to the communication channel. To properly obtain an estimate of just the wireless-communication-channel induced parts of the parameters it is necessary to account for these local condition effects through application of local information about wireless receiver conditions. The local information about wireless receiver conditions 34, is used with the measured estimate of the channel-symbol error rate, and the channel-symbol erasure rate to produce an estimate of the wirelesscommunication-channel induced channel-symbol error rate, and the wireless-communication-channel induced channel-symbol erasure rate as though the local effects were not present. Channel symbol quality statistics can be used as an example of this estimate. As part of producing multiple channel characterizations, channel symbol quality statistics can be computed from comparing the demodulated channel-symbols with the results of message decoding thereby producing a measured estimate of the channel-symbol error rate, and the channel-symbol erasure rate. Local effects also produce additional channel-symbol erasure rate and channel-symbol error rate that do not depend on the communication channel. These local conditions can include periods of time for which the receiving wireless communication device is unable to receive signals due to transmit times or for other reasons. The local conditions do not represent the channel conditions and so they must be accounted for in computing the multiple channel characterization parameters.

The received signal properties 18, with local information about wireless receiver conditions 34 taken into account, are then processed to produce the multiple channel characterization parameters 16. These are typically the statistics of the differences between an ideal mathematical channel model and the communication channel as currently measured based on the received signal properties 18 with the adjustments for local information about wireless receiver conditions 34. An example of such an ideal mathematical channel model is the Additive White Gaussian Noise (AWGN) Channel. Relevant statistics, such as means, and standard deviations, over relevant time intervals are computed concerning the differences between the measured or estimated received signal properties 18, and the ideal mathematical channel model. Normalization of parameters is used to relate the actual transmit power to the received SNR; the information about the actual transmission mode is used to obtain the transmit power used by the transmitting wireless device and then used to normalize the measured received SNR by that transmit power for that particular transmitting wireless device. If necessary to the particular embodiment, other received parameters are normalized to a standard modulation-type or data-rate. Consequently the multiple channel characterization parameters 16, provide a statistical way of indicating the degree to which the actual communication channel is different from an ideal model. Because the concept of normalization is applied to find the differences between the current channel and the ideal channel, the characterization of the communication channel does not significantly depend on the actual transmission mode in use at the time of characterization.

The statistical computation that yields the multiple channel characterization parameters 16, can also be considered as a type of generalized filtering operation. The various comparisons and filtering operations can be arranged in different orders to effect better computational efficiency without departing from the spirit of the invention and the scope of the appended claims.

The multiple channel characterization parameters 16 are projected to nominal communication channel conditions and also to the degraded communication channel conditions for each candidate transmission mode. The projection mathematically transforms the set of multiple channel characterization parameters 16, into a set of 'N' mode testing parameters. There is a set of 'N' Mode Testing Parameters for each of the 'M' candidate transmission modes. These 'M' sets of 'N' parameters correspond to FIG. 1 (20, 20', ... $20^M$) for the case of nominal communication channel conditions and to FIG. 1 (26, 26', ... $26^M$) for the case of degraded communication channel conditions.

The multiple channel characterization parameters 16 are projected into a set of 'N' mode testing parameters for nominal communication channel conditions for each of the 'M' candidate transmission modes through a mathematical model: specifically a model of nominal communication channel conditions 22. The projection is done by first applying a biased and scaled version of the multiple channel characterization corresponding to each candidate transmission modes to the ideal mathematical channel model. The biasing and scaling applied allows for any desired margin in the calculation and sets what constitutes the particular embodiment's definition for nominal communication channel conditions. With this approach, the biasing and scaling applied to local effects may be different and separate from the biasing and scaling applied to that portion of multiple channel characterization parameters 16, corresponding to the wireless-communication-channel induced effects; the local effects (for example the numerical factor of the receive timeline interrupted by transmissions) are not affected directly by the channel conditions. All of the bias and scaled, local and channel estimated parameters are combined to produce the projected parameters for each candidate transmission mode. After all combining of the bias and scaled results, the projection process is completed by extracting 'N' mode testing parameters from an ideal mathematical channel model that correspond to channel elements that can be tested against success criteria.

In effect, the projection described obtains predicted behavior for the signal parameters for all candidate transmission modes without the transmitting wireless device having to actually send transmissions for each of the modes. Each set of 'N' mode testing parameters for the nominal communication channel conditions for the 'M' cases (20, 20', ... $20^M$) are then compared to the conditions that achieve acceptable communication performance for the nominal communication channel conditions case. A determination of success for each particular candidate transmission mode is based on whether the probability of communication given the projected parameters exceeds an embodiment determined probability level. Examples of such criteria could include the symbol error rates and symbol erasure rates needed to achieve a minimum probability of decoding success. The set of candidate transmission modes that achieve the required probability level for nominal communication channel conditions is the first subset of transmission modes 24.

Likewise for the degraded communication channel conditions case multiple channel characterization parameters 16 are also projected into a set of 'N' mode testing parameters for the degraded communication channel conditions for each of the 'M' candidate transmission modes through a mathematical model 28 The projection is done by first applying a biased and scaled version of the multiple channel characterization corresponding to each to each candidate transmission modes to the ideal mathematical channel model. However, the biasing and scaling applied corresponds to what constitutes the particular embodiment's definition for degraded communication channel conditions instead of the nominal communication channel conditions. Any desired margin in the calculation is also included. The biasing and scaling applied to local effects may be different and separate from the biasing and scaling applied to that portion of multiple channel characterization parameters 16, corresponding to the wireless-communication-channel induced effects; the local effects (for example the numerical factor of the receive timeline interrupted by transmissions) are not affected directly by the channel conditions. All of the bias and scaled, local and channel estimated parameters are combined to produce the projected parameters for each candidate transmission mode. After all combining of the bias and scaled results, the projection process is completed by extracting 'N' mode testing parameters from an ideal mathematical channel model that correspond to channel elements that can be tested against success criteria.

In effect the projections obtain predicted behavior for the signal parameters for all candidate transmission modes for the degraded communication channel conditions without the transmitting wireless device having to actually send transmissions for each of the modes or for actual degraded channel conditions to exist. Each set of 'N' mode testing parameters for the degraded communication channel conditions for the 'M' cases (26, 26', ... 26$^M$) are then compared to the conditions that achieve acceptable communication performance for the degraded communication channel conditions case. A determination of success for each particular candidate transmission mode is based on whether the probability of communication given the projected parameters exceeds an embodiment determined probability level. Examples of such criteria could include the symbol error rates and symbol erasure rates needed to achieve a minimum probability of decoding success. The set of candidate transmission modes that achieve the required probability level for degraded communication channel conditions is the second subset of transmission modes 30.

The prediction of whether each of the candidate transmission modes will achieve the desired communication is mathematically equivalent to determining that the point defined by the 'N' mode testing parameters is contained inside of an N-dimensional region defined as a success criteria, with a different success criteria being defined for each of the candidate transmission modes with the first subset of transmission modes being determined from evaluating the mode testing parameters derived from the nominal communication channel conditions and the second subset of transmission modes being determined from evaluating the mode testing parameters derived from the degraded communication channel conditions.

In general, the number of mode testing parameters 'N' can be a different number than the number of parameters contained in either the nominal communication channel conditions or the degraded communication channel conditions. There can also be a different set of mode testing parameters for each of the candidate transmission modes for each case of the nominal communication channel conditions and the degraded communication channel conditions. The transformation can be accomplished through a mathematical operation for which, each of the 'N' mode testing parameters can depend in linear or non-linear ways on some or all of the parameters contained in either the nominal communication channel conditions or the degraded communication channel conditions.

The one selected transmission mode 14 is selected by using information from the first subset of transmission modes 24 and the second subset of transmission modes 30. The selected transmission mode 14 is obtained through the use of predetermined transmission mode selection rules 32 that embody the communication objectives to maximize communication objectives while remaining stable based on the principles discussed below.

The transmission mode selection rules 32 comprise computational implementations of the following five mode selection principles. The first three mode selection principles can be applied in any numerical order followed by mode selection principle #4, followed by mode selection principle #5:

Mode selection principle #1: Discard modes with unnecessarily high transmit-power—Discard any of the modes from within the first subset of transmission modes with a particular combination of transmit-power, data-rate, and modulation-type when a mode is present within the second subset of transmission modes that has the same data-rate and the same modulation-type but having a lower transmit-power.

Mode selection principle #2: Discard modes with unnecessarily low data-rates—Discard modes from within the first subset of transmission modes with a particular transmit-power, data-rate, and modulation-type when a mode is present within the second subset of transmission modes, with the same transmit-power and the same modulation-type but having a higher data-rate Mode selection principle #3: Discard modes with unnecessarily high bandwidths—Discard modes from within the first subset of transmission modes with a particular transmit-power, data-rate, and modulation-type when a mode is present within the second subset of transmission modes, with the same transmit-power and the same data-rate but having a modulation-type with a lower bandwidth.

In many well behaved cases, these first three mode selection principles are equivalent to eliminating blocks on the interior of a 3 dimensional region where the blocks represent transmit modes and the dimensions represent the choice of transmit power, transmit data-rate, and modulation type; this equivalence holds when these transmit parameters are each ordered on their respective axis according to the least robust to the most robust as the axis is followed away from the origin. Only blocks near the edge of the region are left corresponding to transmit modes which met the combined aspects of nominal communication channel conditions and the degraded communication channel conditions cases. This edge block equivalency allow for computational simplifications in specific embodiments. In the case where the transmit operations can be generalized into continuous variables rather than discrete values, the first three mode selection principles are equivalent to eliminating the interior of a 3 dimensional region leaving only a surface (or a shell) of validity. The thickness of the layer of blocks near the edge (or the thickness of the shell) will depend on the degree to which the degraded communication channel conditions are designed to differ from the nominal communication channel conditions.

Mode selection principle #4: Employ hysteresis for stability—If after discarding modes per mode selection principle #1, mode selection principle #2, and mode selection principle #3, the set of remaining modes still contains the mode that was chosen as the selected transmission mode from the last time the evaluation was conducted, then the new selected transmission mode remains the same as the previous selected transmission mode and mode selection principle #5 is skipped. Mode selection principle #4 is equivalent to discarding all modes other than the previously selected transmission mode if that mode is present in the current set.

Mode selection principle #5: chose the best cost mode—Use a networking cost function to rank the remaining modes, the Lowest networking cost mode remaining in the list after discarding modes per the Mode Selection Principles #1, #2, #3, and #4 is chosen to be the new Selected Transmission Mode.

Modulation-type is the form of the changes applied to the transmitted signal that allow the conveyance of information from one wireless communication device to another. Examples of modulation-type include (but are not limited to) amplitude modulation, frequency modulation, phase shift modulation, and their digital equivalents such as, Amplitude Shift Keying (ASK), Frequency Shift Keying (FSK), Phase Shift Keying (PSK), and all the variations and hybrids including Quadrature Phase Shift Keying (QPSK), Quadrature Amplitude Modulation (QAM), etc. In the context of the description of the present invention different modulation-type can also include the rate at which the modulation is conveyed. This rate is sometimes called "baud" or channel-symbol rates. Although this can affect the overall data-rate, this invention primarily uses the term modulation-type to refer to technological means of affecting a change in the bandwidth. Different modulation-types achieve different amounts of bandwidth usage for a given data-rate; modulation-types with wider bandwidths are typically more robust to noise and inference than those that use less bandwidth.

Data-rate is the number of information bits per second that the wireless communication device is attempting to convey. The information bits are measured consistent with definitions of information theory concepts such as used by the Shannon-Hartley capacity theorem. Consequently, the term data-rate is not used of the "baud" or channel-symbol rates that is affected by choice of modulation-type but refers to the rate of the desired data that one wireless communication device attempts to convey to another wireless communication device. Although in general communication systems changes to data-rate can affect the overall bandwidth, this invention primarily uses the term data-rate to refer to technological means of affecting a change in the rate of information flow between wireless communication devices without affecting modulation-type or bandwidth. Examples of technological means of affecting a change to data-rate include applications of variable amounts of redundant transmissions such as repeated transmission, or variable-rate forward-error-correcting FEC codes. The concepts of application of repeat transmissions and FEC codes and their use to achieve variable rate transfer of information across noisy channels are well known to persons having ordinary skill in the art and will not be described further.

The networking cost function is wireless network dependent; each transmission mode will have an associated network cost but the relation of that cost to transmit power, transmit data-rate, and modulation type can be completely independent of any of the other link adaptation considerations. However, in some cases where the cost function is dependent on the transmit power, transmit data-rate, and modulation type in a simple separable monotonic fashion, it may be possible to realize further computational simplifications arising from the cost function mapping simply onto the 3 dimensional region equivalence.

In general the degraded communication channel conditions used for mode selection principles #1, mode selection principles #2, and mode selection principles #3 do not have to be the same; the degraded communication channel conditions to achieve the second subset of transmission modes used with the mode selection principle #1 can be designed specifically to address the properties of the mode selection principle #1 which can be different from the degraded communication channel conditions to achieve the second subset of transmission modes used with the mode selection principle #2 can be designed specifically to address the properties of the mode selection principle #2 which can be different from the degraded communication channel conditions used in determining the second subset of transmission modes used with the mode selection principle #3 which can be designed specifically to address the properties of the mode selection principle #3. This however in some cases may change the selection functions so that the overall selection is not equivalent to the 3 dimensional representations of edge blocks or surfaces previously indicated for simpler cases. Complex interference cases may also preclude treating the selection functions as equivalent to these 3 dimensional representations.

The present invention includes embodiments wherein the wireless communication device 10, at the receiving end of the communication link performs the link adaptation calculations and then communicates these decisions to the transmitting end wireless communication device or embodiments wherein the transmitting end of the communication link performs the link adaptation calculation based on the receiving end wireless communication device conveying the received signal properties 18, or multiple channel characterization parameters 16, to the transmitting wireless communication device.

Other embodiments and configurations may be devised without departing from the spirit of the invention and the scope of the appended claims.

The invention claimed is:

1. A wireless communication device for cooperatively exchanging information with a plurality of other communication devices, comprising:
   a processor configured to determine, from signals received from other communication devices, one selected transmission mode for the communication channel conditions, said determination being by:
   a) obtaining multiple channel characterization parameters from signal quality parameters extracted from the available received signal properties that are being transmitted at any candidate transmission mode available to the transmitting wireless device;
   b) projecting said multiple channel characterization parameters in a mathematical model to each of said candidate transmission modes using a model of nominal communication channel conditions to predict whether each of said candidate transmission modes will achieve the desired communication under said nominal communication channel conditions thus generating a first subset of transmission modes;
   c) projecting said multiple channel characterization parameters in a mathematical model to each of said candidate transmission modes using a model of degraded communication channel conditions to predict whether each of said candidate transmission modes will achieve the desired communication under said degraded communication channel conditions, thus generating a second subset of transmission modes that would successfully achieve communication; and,
   d) selecting, from said first subset of transmission modes and said second subset of transmission modes, the one selected transmission mode that maximizes communication objectives while remaining stable, said selected transmission mode being obtained through the use of predetermined transmission mode selection rules that embody the communication objectives;
   wherein the characterization of the communication channel does not depend on the actual transmission mode in use at the time of characterization; and,
   wherein said transmission mode selection rules to determine said one selected transmission mode from said first subset of transmission modes and said second subset of transmission modes, comprise computational implementations from one or more of the first 3 mode selection principles; mode selection principle #1, mode selection principle #2, mode selection principle #3, being applied with cumulative effect in any numerical order followed by mode selection principle #4 followed by #5:
   i) mode selection principle #1: discard modes with unnecessarily high transmit-power—discard any of the modes from within said first subset of transmission modes with a particular combination of transmit-power, data-rate, and modulation-type when a mode is present within said second subset of transmission modes that has the same combination of data-rate and modulation-type but having a lower transmit-power;

ii) mode selection principle #2: discard modes with unnecessarily low data-rates—discard modes from within said first subset of transmission modes with a particular transmit-power, data-rate, and modulation-type when a mode is present within said second subset of transmission modes, with the same transmit-power and the modulation-type but having a higher data-rate;

iii) mode selection principle #3: discard modes with unnecessarily high bandwidths—discard modes from within said first subset of transmission modes with a particular transmit-power, data-rate, and modulation-type when a mode is present within said second subset of transmission modes, with the same transmit-power and data-rate but having a modulation-type with a lower bandwidth;

iv) mode selection principle #4: employ hysteresis for stability—If after discarding modes per mode selection principle #1, mode selection principle #2, and mode selection principle #3, the set of remaining modes still contains the mode that was chosen as the selected transmission mode from the last time the evaluation was conducted, then the new selected transmission mode remains the same as the previous selected transmission mode and mode selection principle #5 is skipped; and, v) mode selection principle #5: choose the best cost mode—use a networking cost function to rank remaining modes, the lowest networking cost mode remaining in the list, after discarding modes per the mode selection principles #1, #2, #3, and #4, is chosen to be the new selected transmission mode; the networking cost function is wireless network dependent.

2. The device of claim 1 wherein said wireless communication device determines said selected transmission mode for a plurality of other wireless communication devices that are transmitting data to said wireless communication device.

3. The device of claim 1 wherein said multiple channel characterization parameters are obtained from statistics of the differences collected between an ideal mathematical channel model and the communication channel as currently measured based on said received signal properties and local information about wireless receiver conditions.

4. The device of claim 3 wherein said multiple channel characterization parameters are derived from a group of parameters including: the signal-to-noise ratio (SNR), signal strength, phase stability, frequency stability, message decoding success statistics, channel symbol quality statistics, and an indication of which said actual transmission mode was used to transmit the signal to a receiver of the wireless communication device.

5. The device of claim 4 wherein, said channel symbol quality statistics are computed from comparing the demodulated channel-symbols with the results of message decoding thereby producing: a wireless-communication-channel induced channel-symbol error rate, a wireless-communication-channel induced channel-symbol erasure rate, while also taking into account said local information about wireless receiver conditions that also produce additional channel-symbol erasure rate and channel-symbol error rate that do not depend on the communication channel.

6. The device of claim 3 wherein said projecting of said multiple channel characterization parameters to said nominal communication channel conditions for said candidate transmission modes is accomplished by applying said statistics of the differences collected to said ideal mathematical channel model for each of said candidate transmission modes, with biasing and scaling operations of said statistics of the differences chosen to correspond to each of said nominal communication channel conditions for each said candidate transmission modes.

7. The device of claim 6 wherein said projecting of said multiple channel characterization parameters to said degraded communication channel conditions for said candidate transmission modes is accomplished by applying statistics of the differences collected to said ideal mathematical channel model for each of said candidate transmission modes, with said biasing and scaling operations of said statistics of the differences chosen for each of said candidate transmission modes such that results produce conditions that are degraded as compared to said nominal communication channel conditions.

8. The device of claim 6 wherein said projecting of said multiple channel characterization parameters to either said nominal communication channel conditions or said degraded communication channel conditions is accomplished by: applying biasing and scaling operations to that portion of said multiple channel characterization parameters that have been derived primarily from said received signal properties that are different from biasing and scaling operations applied to that portion of said multiple channel characterization parameters that have been derived primarily from said local information about wireless receiver conditions.

9. A wireless communication device for cooperatively exchanging information with a plurality of other communication devices, comprising:
  a processor configured to determine, from signals received from other communication devices, one selected transmission mode for the communication channel conditions, said determination being by:
    a) obtaining multiple channel characterization parameters from signal quality parameters extracted from the available received signal properties that are being transmitted at any candidate transmission mode available to the transmitting wireless device;
    b) projecting said multiple channel characterization parameters in a mathematical model to each of said candidate transmission modes using a model of nominal communication channel conditions to predict whether each of said candidate transmission modes will achieve the desired communication under said nominal communication channel conditions thus generating a first subset of transmission modes;
    c) projecting said multiple channel characterization parameters in a mathematical model to each of said candidate transmission modes using a model of degraded communication channel conditions to predict whether each of said candidate transmission modes will achieve the desired communication under said degraded communication channel conditions, thus generating a second subset of transmission modes that would successfully achieve communication; and,
    d) selecting, from said first subset of transmission modes and said second subset of transmission modes, the one selected transmission mode that maximizes communication objectives while remaining stable, said selected transmission mode being obtained through the use of predetermined transmission mode selection rules that embody the communication objectives;

wherein the characterization of the communication channel does not depend on the actual transmission mode in use at the time of characterization; and, wherein said nominal communication channel conditions and said degraded communication channel conditions are mathematically transformed into a set of 'N' mode testing parameters wherein:
 a) the number 'N' can be a different number than the number of parameters contained in either said nominal communication channel conditions or said degraded communication channel conditions;
 b) there is a different set of mode testing parameters for each of said candidate transmission modes for each case of said nominal communication channel conditions and said degraded communication channel conditions; and,
 c) the transformation is accomplished through a mathematical operation for which, each of the 'N' mode testing parameters can depend in linear or non-linear ways on some or all of the parameters contained in either said nominal communication channel conditions or said degraded communication channel conditions.

10. The device of claim 9 wherein said prediction of whether each of said candidate transmission modes will achieve the desired communication is mathematically equivalent to determining that the point defined by said 'N' mode testing parameters is contained inside of an N-dimensional region defined as a success criteria, with a different success criteria being defined for each of said candidate transmission modes with said first subset of transmission modes being determined from evaluating said mode testing parameters derived from said nominal communication channel conditions and said second subset of transmission modes being determined from evaluating said mode testing parameters derived from said degraded communication channel conditions.

11. The device of claim 1 wherein said degraded communication channel conditions used in determining said second subset of transmission modes used with said mode selection principle #1 are designed specifically to address the properties of said mode selection principle #1 and can be different from said degraded communication channel conditions used in determining said second subset of transmission modes used with said mode selection principle #2 are designed specifically to address the properties of said mode selection principle #2 and can be different from said degraded communication channel conditions used in determining said second subset of transmission modes used with said mode selection principle #3 which are designed specifically to address the properties of said mode selection principle #3.

12. The device of claim 1 wherein the plurality of said other wireless communication devices each determines said selected transmission mode to transmit data to said wireless communication device based on said wireless communication device conveying said received signal properties or multiple channel characterization parameters to the plurality of other wireless communication devices.

13. A method for cooperatively exchanging information between a wireless communication device and a plurality of other communication devices, comprising the steps of:
 a) obtaining multiple channel characterization parameters, utilizing a processor, from signal quality parameters extracted from the available received signal properties that are being transmitted at any candidate transmission mode available to the transmitting wireless device;
 b) projecting said multiple channel characterization parameters in a mathematical model to each of said candidate transmission modes using a model of nominal communication channel conditions to predict whether each of said candidate transmission modes will achieve the desired communication under said nominal communication channel conditions thus generating a first subset of transmission modes;
 c) projecting said multiple channel characterization parameters in a mathematical model to each of said candidate transmission modes using a model of degraded communication channel conditions to predict whether each of said candidate transmission modes will achieve the desired communication under said degraded communication channel conditions, thus generating a second subset of transmission modes that would successfully achieve communication; and,
 d) selecting, from said first subset of transmission modes and said second subset of transmission modes, the one selected transmission mode that maximizes communication objectives while remaining stable, said selected transmission mode being obtained through the use of predetermined transmission mode selection rules that embody the communication objectives;

wherein the characterization of the communication channel does not depend on the actual transmission mode in use at the time of characterization, wherein said nominal communication channel conditions and said degraded communication channel conditions are mathematically transformed into a set of 'N' mode testing parameters wherein:
 a) the number 'N' can be a different number than the number of parameters contained in either said nominal communication channel conditions or said degraded communication channel conditions;
 b) there is a different set of mode testing parameters for each of said candidate transmission modes for each case of said nominal communication channel conditions and said degraded communication channel conditions; and,
 the transformation is accomplished through a mathematical operation for which, each of the 'N' mode testing parameters can depend in linear or non-linear ways on some or all of the parameters contained in either said nominal communication channel conditions or said degraded communication channel conditions.

14. The method of claim 13 wherein said wireless communication device determines said selected transmission mode for a plurality of other wireless communication devices that are transmitting data to said wireless communication device.

15. The method of claim 13 wherein said multiple channel characterization parameters are obtained from statistics of the differences collected between an ideal mathematical channel model and the communication channel as currently measured based on said received signal properties and local information about wireless receiver conditions.

16. The method of claim 15 wherein said multiple channel characterization parameters are derived from a group of parameters including: the signal-to-noise ratio (SNR), signal strength, phase stability, frequency stability, message decoding success statistics, channel symbol quality statistics, and an indication of which said actual transmission mode was used to transmit the signal to a receiver of the wireless communication device.

17. The method of claim 16 wherein, said channel symbol quality statistics are computed from comparing the demodulated channel-symbols with the results of message decoding thereby producing: a wireless-communication-channel induced channel-symbol error rate, a wireless-communication-channel induced channel-symbol erasure rate, while also taking into account said local information about wireless receiver conditions that also produce additional channel-symbol erasure rate and channel-symbol error rate that do not depend on the communication channel.

18. The method of claim 15 wherein said projecting of said multiple channel characterization parameters to said nominal communication channel conditions for said candidate transmission modes is accomplished by applying said statistics of the differences collected to said ideal mathematical channel model for each of said candidate transmission modes, with biasing and scaling operations of said statistics of the differences chosen to correspond to each of said nominal communication channel conditions for each said candidate transmission modes.

* * * * *